United States Patent
Kang et al.

(10) Patent No.: US 10,871,753 B2
(45) Date of Patent: Dec. 22, 2020

(54) FEEDBACK LOOP DRIVEN END-TO-END STATE CONTROL OF COMPLEX DATA-ANALYTIC SYSTEMS

(71) Applicant: Accenture Global Solutions Limited, Dublin (IE)

(72) Inventors: Jaeyoung Christopher Kang, Berkeley, CA (US); Jürgen Albert Weichenberger, Woking (GB); Teresa Sheausan Tung, San Jose, CA (US); William R. Gatehouse, West Sussex (GB); Tiffany Cecilia Dharma, Mountain View, CA (US); Jan Andre Nicholls, Walton-on-Thames (GB)

(73) Assignee: Accenture Global Solutions Limited, Dublin (IE)

(*) Notice: Subject to any disclaimer, the term of this patent is extended or adjusted under 35 U.S.C. 154(b) by 683 days.

(21) Appl. No.: 15/445,077

(22) Filed: Feb. 28, 2017

(65) Prior Publication Data
US 2018/0032038 A1  Feb. 1, 2018

Related U.S. Application Data (60) Provisional application No. 62/367,454, filed on Jul. 27, 2016.

(51) Int. Cl.
*G05B 17/02* (2006.01)
*G06N 20/00* (2019.01)
(52) U.S. Cl.
CPC ............. *G05B 17/02* (2013.01); *G06N 20/00* (2019.01)

(58) Field of Classification Search
CPC ....................................................... G06N 20/00
See application file for complete search history.

(56) References Cited

U.S. PATENT DOCUMENTS

| | | | |
|---|---|---|---|
| 5,991,535 A | 11/1999 | Fowlow et al. | |
| 6,208,345 B1 | 3/2001 | Sheard et al. | |
| 7,636,894 B2 | 12/2009 | Vedula et al. | |
| 8,250,009 B1 | 8/2012 | Breckenridge et al. | |
| 8,271,541 B2 | 9/2012 | Mohan et al. | |
| 8,364,613 B1 | 1/2013 | Lin et al. | |
| 8,719,804 B2 | 5/2014 | Jain | |
| 8,886,788 B2 | 11/2014 | Tung et al. | |
| 9,043,337 B1 | 5/2015 | Chen et al. | |
| 9,135,559 B1 | 9/2015 | Chan et al. | |

(Continued)

FOREIGN PATENT DOCUMENTS

EP   2463790 A1   6/2012

OTHER PUBLICATIONS

IBM SPSS Modeler 15 User's Guide, Jan. 1, 2012, XP055272523.

(Continued)

*Primary Examiner* — Eric Nilsson
(74) *Attorney, Agent, or Firm* — Brinks Gilson & Lione (57) ABSTRACT

A system provides feedback driven end-to-end state control of a data model. A data model may be used to model the behavior of a monitored system to predict future events. The system may be used to ensure proper operation of the data model. Contingency data models may be executed when a failure is detected. Further, when the system detects accuracy that is out of tolerance, the system may initiate retraining of the data model being currently used.

15 Claims, 10 Drawing Sheets

(56) References Cited

U.S. PATENT DOCUMENTS

| | | | |
|---|---|---|---|
| 10,387,798 | B2 | 8/2019 | Duggan et al. |
| 10,438,132 | B2 | 10/2019 | Duggan et al. |
| 2005/0171746 | A1 | 8/2005 | Thalhammer-Reyero |
| 2006/0259908 | A1 | 11/2006 | Bayer |
| 2007/0016615 | A1 | 1/2007 | Mohan |
| 2007/0157179 | A1 | 7/2007 | Seeger et al. |
| 2007/0240080 | A1 | 10/2007 | Eldridge et al. |
| 2012/0191630 | A1 | 7/2012 | Breckenridge et al. |
| 2012/0284600 | A1 | 11/2012 | Lin et al. |
| 2013/0144819 | A1 | 6/2013 | Lin |
| 2013/0152047 | A1* | 6/2013 | Moorthi ............... G06F 11/368 717/124 |
| 2014/0046879 | A1 | 2/2014 | Maclennan et al. |
| 2014/0278312 | A1 | 9/2014 | Nixon et al. |
| 2014/0279725 | A1 | 9/2014 | Kuusela |
| 2015/0161385 | A1 | 6/2015 | Gounares |
| 2015/0170048 | A1 | 6/2015 | Lin et al. |
| 2015/0235143 | A1 | 8/2015 | Eder |
| 2015/0321427 | A1 | 11/2015 | Gunnarsson |
| 2015/0339572 | A1 | 11/2015 | Achin et al. |
| 2015/0341212 | A1 | 11/2015 | Hsiao |
| 2015/0378716 | A1 | 12/2015 | Singh |
| 2016/0132787 | A1 | 5/2016 | Drevo |
| 2016/0300156 | A1 | 10/2016 | Bowers |
| 2016/0307115 | A1* | 10/2016 | Wu ........................ G06F 17/11 |
| 2017/0032279 | A1* | 2/2017 | Miserendino ..... H04W 12/1208 |
| 2017/0115964 | A1 | 4/2017 | Vadapandeshwara et al. |
| 2017/0178019 | A1 | 6/2017 | Duggan |
| 2017/0178020 | A1 | 6/2017 | Duggan |
| 2017/0178027 | A1 | 6/2017 | Duggan |
| 2017/0316114 | A1 | 11/2017 | Bourhani et al. |
| 2018/0032038 | A1 | 2/2018 | Kang et al. |

OTHER PUBLICATIONS

Khin Me Me Thein, "Apache Kafka: Next Generation Distributed Messaging System", International Journal of Scientific Engineering and Technology Research, vol. 3, No. 47, Dec. 1, 2014, pp. 9478-9483.

European Office Action issued for European patent application No. 16199043.7 dated Jan. 27, 2020, 14 pages.

Office Action in Europe Application No. 16199057.7, dated Jun. 8, 2020, 5 pages.

Extended European Search Report in European Application No. 17167892.3, dated Sep. 14, 2017, 9 pages.

Communication Pursuant to Article 94(3) EPC in European Application No. 17167892.3, dated Aug. 22, 2019, 7 pages.

Australian Patent Office, First Examination Report for Australia Application No. 2017202599 dated Oct. 20, 2017, 8 pages.

Australian Patent Office, First Examination Report for Australian Patent Application No. 2016259298 dated Apr. 21, 2017, 6 pages.

Australian Patent Office, First Examination Report for Australian Patent Application No. 2016259300 dated Apr. 12, 2017, 5 pages.

Australian Patent Office, Notice of Acceptance for Australian Patent Application No. 2016259300 dated May 24, 2017, 3 pages.

Australian Patent Office, Second Examination Report for Australian Patent Application No. 2017202599 dated Apr. 6, 2018, pp. 1-3.

Australian Patent Office, Second Examination Report for Australian Patent Application No. 2016259298 dated Jul. 31, 2017, 3 pages.

European Patent Office, European Search Report from European Patent Application No. 17167892.3 dated Nov. 1, 2017, 2 pages.

European Patent Office, Extended European Search Report for European Patent Application No. 16199043.7 dated May 18, 2017, 10 pages.

European Patent Office, Extended European Search Report from European Patent Application No. 16199057.7 dated May 22, 2017, 7 pages.

Final Office Action dated Dec. 26, 2018, in related U.S. Appl. No. 15/198,711, 24 pgs.

Guazzelli et al. "PMML: An open standard for sharing models." The R Journal 1(1), pp. 60-65, 2009, [retrieved from Internet on Sep. 11, 2017] <URL: https://journal.r-project.org/archive/2009-1/RJournal_2009-1_Guazzelli+et +al.pdf>, 6 pages.

Guazzelli et al., "Efficient deployment of predictive analytics through open standards and cloud computing." ACM SIGKDD Explorations Newsletter 11(1), pp. 32-38, 2009, [retrieved from Internet on Apr. 11, 2017] <URL: http://zementis.com/docs/SIGKDD_ADAPA.pd>.

Kosaku et al., "Runtime Composition for Extensible Big Data Processing Platforms", 2015 IEEE 8th International Conference on Cloud Computing, Jun. 1, 2015, pp. 1053-1057, XP055272472, DOI: 10.1109/CLOUD.2015.151, ISBN 978-1-4673-7287-9.

Non-Final Office Action dated Dec. 26, 2018, in related U.S. Appl. No. 14/971,982, 14 pgs.

Non-Final Office Action dated Feb. 28, 2019, in related U.S. Appl. No. 14/971,987, 10 pgs.

Non-Final Office Action dated Mar. 7, 2019, in related U.S. Appl. No. 15/420,947, 27 pgs.

Notice of Allowance issued for related U.S. Appl. No. 14/971,982 dated Jun. 20, 2019, 8 pgs.

Sun et al., "Towards Delivering Analytical Solutions in Cloud: Business Models and Technical Challenges", 2011 Eight IEEE International Conference on e-Business Engineering, pp. 347-351, IEEE, 2011.

* cited by examiner

Dependency Matrix 400

Header 402

| Entry | Dependency Descriptor 412 | Indicator | ○ No-Run | ● REP | ○ Non-Mandatory | 410 / 414 |
| Entry | Dependency Descriptor 412 | Indicator | ○ No-Run | ○ REP | ● Non-Mandatory | 410 / 414 |
| Entry | Dependency Descriptor 412 | Indicator | ○ No-Run | ● REP | ○ Non-Mandatory | 410 / 414 |
| Entry | Dependency Descriptor 412 | Indicator | ● No-Run | ○ REP | ○ Non-Mandatory | 410 / 414 |
| Entry | Dependency Descriptor 412 | Indicator | ● No-Run | ○ REP | ○ Non-Mandatory | 410 / 414 |
| Entry | Dependency Descriptor 412 | Indicator | ○ No-Run | ○ REP | ● Non-Mandatory | 410 / 414 |

| Model Manager | Model Library | Model Templates | | | | | |
|---|---|---|---|---|---|---|---|
| | | | | | | | Search |

Model Library

Create New Model

| All Models | Action Dialogues | My Models | My Experiments | | | | |
|---|---|---|---|---|---|---|---|
| Action | ID ↓ | Owner ↓ | Name ↓ | Template ↓ | Variable ↓ | Performance ↓ | State ↓ |
| | 12759 | Operator 1 | Linear Reg 5 | Linear Reg | Failure Risk | --/-- | Training |
| ★ | 12345 | Operator 1 | Linear Reg 213 | Linear Reg | Failure Risk | 97/88 | Trained |
| ★ | 12874 | Operator 1 | Linear Reg 213 | Linear Reg | Failure Risk | 97/88 | Trained |
| ! | 01954 | Operator 1 | K Means 124 | K Means | Output | 88/92 | Trained |

Rows Per Page: 10 ▼     1-10 of 100 ↓ ↑

Linear Reg 213

READY TO DEPLOY
State    Trained
Quality   67%
Metric    Accuracy
Retraining Daily
Model    Linear Reg Trained
14-May-16
12:23

Created
14-May-16
08:23

Edit    Deploy    Retire

FEEDBACK LOOP DRIVEN END-TO-END STATE CONTROL OF COMPLEX DATA-ANALYTIC SYSTEMS

PRIORITY

This application claims priority to U.S. Provisional Application Ser. No. 62/367,454, filed Jul. 27, 2016, titled FEEDBACK LOOP DRIVEN END-TO-END STATE CONTROL OF COMPLEX DATA-ANALYTIC SYSTEMS, which is entirely incorporated by reference.

TECHNICAL FIELD

This disclosure relates to state control of a complex data-analytic system.

BACKGROUND

Rapid advances in complex hardware platforms for data analytics, driven by immense enterprise demand, have resulted in widespread adoption of data centers and predictive data forecasting. As one example, modern enterprise systems maintain data records many terabytes in size and predict events ranging from election outcomes to product market demand. Improvements in analytic prediction accuracy and speed will further enhance the capabilities of complex hardware platforms for data analytics.

DETAILED DESCRIPTION

In feedback loop driven control systems, the system output (or some portion thereof) is sent back to the system to control future operation. For example, in a feedback loop driven amplifier circuit, a portion of the amplifier output may be returned as input to the system to hold the amplifier circuit within a defined tolerance. Similarly, in a feedback loop driven end-to-end state control system, outputs such as predictive data, sensed data, input model data, or data at other points in the system may be analyzed for compliance with one or more metrics, such as, tolerances, thresholds, or other metrics. Based on the analysis, circuitry within the system may update the state of the system. For example, the system may indicate that a data model is due for retraining. Additionally or alternatively, the system may indicate that a data model may be unreliable and may warrant a refresh to an earlier state or replacement.

The system may use the data model may be used by the system to predict future operational states of a monitored system. For example, the system may use the data model to predict pressure variations within a particular portion of a water utility delivery grid. In another example, the data model may be used to predict foaming events within a petrochemical refining system. Accordingly, the value of the data model may be proportional to the data model's operational performance and predictive accuracy.

For example, in a feedback loop driven end-to-end state control system, the system may use the state control to monitor the status of analytics system which includes a data model and one or more contingency data models. The feedback loop driven end-to-end state control system may verify the data models and contingency data models using on or more criteria set by system operators. If the data models and contingency data models meet the criteria, the feedback loop driven end-to-end state control system may analyze the output of the models using an accuracy check. Depending on the outcome of the accuracy check, the feedback loop driven end-to-end state control system may take a system tuning action, such as retraining, replacement, notification or the system tuning action to correct operation of the data model.

The feedback loop driven end-to-end state control system may guard against operation of or reliance on predictions of future operational states of a monitored system by data models undergoing improper operation. The interfaces of the feedback loop driven end-to-end state control system may present operators with operational for multiple data models running in parallel. Data model monitoring paired with contingency data model execution may increase the likelihood of continuous data model operation compared with systems lacking data model monitoring and contingency data model execution. Accordingly, the feedback loop driven end-to-end state control system provides a technical improvement over existing market solutions.

Figure 1:
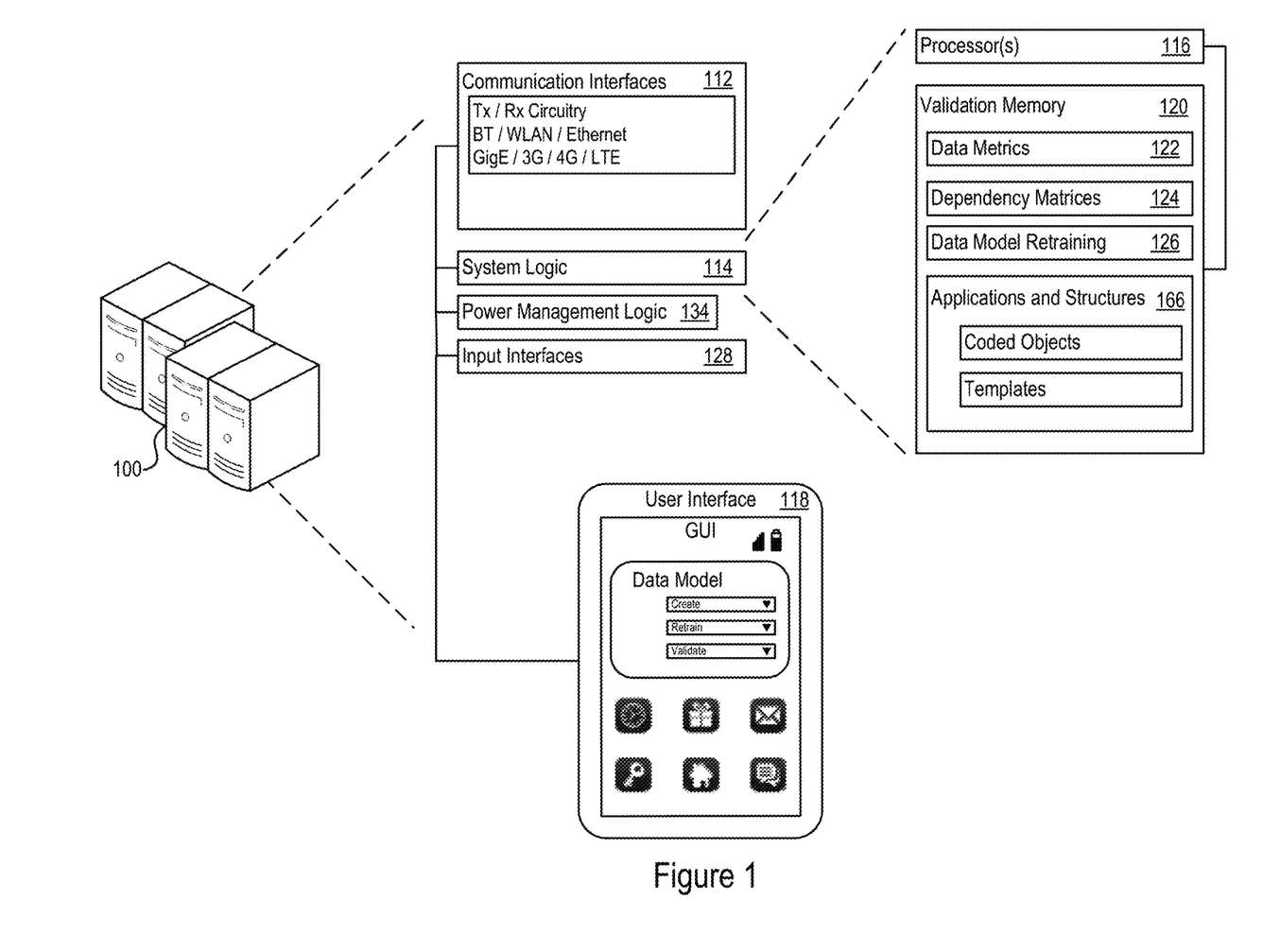
FIG. 1 shows an example specific execution environment for the feedback loop driven end-to-end state control system.

FIG. 1 shows an example specific execution environment 100 for the feedback loop driven end-to-end state control system. The execution environment 100 may include system logic 114 to support execution of the state control system. The system logic may include processors 116, validation memory 120, and/or other circuitry.

The validation memory 120 may store the data models, data metrics 122, data model dependency matrices 124, and data model retraining information 126. The memory may further include applications and structures 166, for example, coded objects, templates, or other structures to support data model validation, accuracy checking, or retraining. For example, the applications and structures may support the model execution logic and model deployment logic described below.

The execution environment 100 may also include communication interfaces 112, which may support wireless, e.g. Bluetooth, Wi-Fi, WLAN, cellular (4G, LTE/A), and/or wired, Ethernet, Gigabit Ethernet, optical networking protocols. The communication interface may support communication with repository control circuitry using one or more link types, such as those supported by the interfaces 112. The execution environment 100 may include power management logic 134 and various input interfaces 128. The execution environment may also include a user interface 118 that may include human interface devices and/or graphical user interfaces (GUI). In various implementations, the system logic 114 may be distributed over multiple physical servers and/or be implemented as a virtual machine. For example, the system logic 114 may be implemented on a cloud-based hardware platform.

Figure 2:
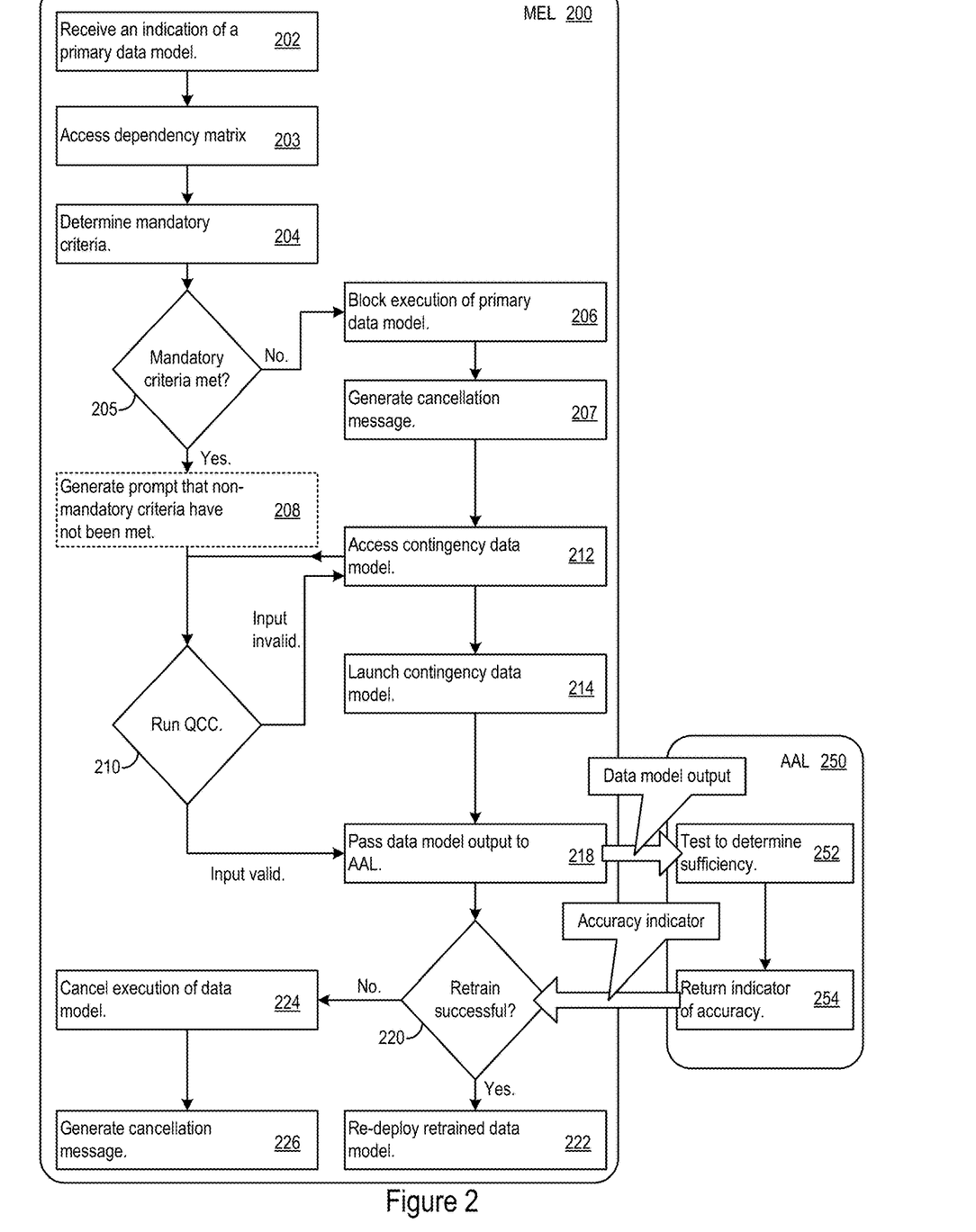
FIG. 2 shows model execution logic coupled with accuracy analysis logic.

FIG. 2 shows model execution logic (MEL) 200 coupled with accuracy analysis logic (AAL) 250. The MEL 200 may supervise execution of data models for an end-to-end feedback loop driven control systems. The MEL 200 may receive an indication of a primary data model to execute for an end-to-end feedback loop driven control system (202). The MEL 200 may access a dependency matrix stored within a validation memory (e.g., validation memory 120) (203). Responsive to the dependency matrix, the MEL 200 may determine one or more mandatory execution criteria for the primary data model (204). For example, the MEL may access one or more entries within the dependency matrix to determine if the primary data model is a child data model dependent on a parent data model. A first data model is a child of a second (parent) data model if the first data model's operation is dependent on the operation of the second data model. In various implementations, either or both primary and contingency data models may also be parent or child data models. Once the one or more mandatory criteria have been determined, the MEL may determine whether the determined mandatory criteria have been met (205).

In response to a failed validation, for example, when a mandatory execution criterion is not met, the MEL 200 may block execution of the primary model. Taking this action may prevent improper operation of the child data model, particularly when the system discovers that criteria for validation are not met (206). For example, when a parent data model is inoperative, a child data model may not necessary perform properly. The MEL 200 may generate a cancellation message to inform an operator that the data model should not be operated (207). For example, the MEL 200 may generate a prompt with the message, "excuse me, but it's not the right time to run that model," or other similar message.

In some cases, some criteria listed in the dependency matrix for a primary data model may be non-mandatory criteria. Accordingly, a primary data model may be deemed by the MEL 200 to pass a validation even in cases where one or more non-mandatory criteria have not been met. The MEL 200 may generate a prompt indicating that one or more of the non-mandatory criteria have not been met (208). The prompt may include an option to terminate or cancel execution of the primary data model. Additionally or alternatively, the prompt may include instructions or a link to instructions that guide an operator with regard to adjusting parameters to meet the criteria or cancelling execution of the primary data model.

After the MEL 200 has determined whether criteria for execution have been met, the MEL 200 may run a quality control check (QCC) (210). The QCC may be a quality check for the input data to the data model. For example, the MEL 200 may compare input data from the model to a template. For example, a primary/child data model may use data output from a parent data model. The MEL 200 may compare feedback data, e.g., output data that is "fed back" to the system for analysis, from the parent with the template. If the data from the parent model does not fit within the confines of the template, the MEL 200 may determine to correct the parent model or determine that the parent model has failed.

In an example scenario, a primary data model may be configured to receive Fahrenheit temperature reading rather than Celsius. Accordingly, the quality check may identify this inconsistency, e.g., through comparison with a template for the data input, and remedy it. For example, the input data may be accompanied by metadata indicating an incorrect temperature scale. Additionally or alternatively, the provided data may be outside a valid temperature range. For example, the MEL 200 may be configured to reject input data indicating a liquid temperature above a boiling point for a given combination of pressure and liquid type.

If the input data for the primary data model is not correct or not valid, the MEL may access a contingency data model (212). The contingency data model may be used as a back-up to help to avoid process problems, such as losing active tracking and control of a process governed by the primary data model. For example, for petrochemical industry processes, a process need not necessarily stop because the MEL 200 determines a problem with the primary data model and, e.g., loses the ability to monitor the data from the process using the primary data model. Accordingly, a monitored plant may continue producing with or without data model monitoring. Hence, the MEL 200 may cause backup data model instantiation in an end-to-end system to maintain the ability to generate insights different (whether better, worse or in a different form) than what the primary data model would generate, when the primary data model is unavailable.

Accordingly, the MEL 200 may guide a system running a data model automatically into a contingency mode or fallback mode. In addition, the MEL 200 may further validate the contingency data model. If the contingency data model fails the MEL 200 may initiate a series of contingency data models until no additional contingency data models are available. If the system has no working contingency data models, the monitored process may continue to operate without automated monitoring through the MEL 200. If that validation for the contingency data model is successful, the MEL 200 may launch the contingency data model (214).

Additionally or alternatively, the MEL 200 may attempt to execute data models for which an operator cancelled execution in response to a failure to meet non-mandatory criteria. In some cases, an operator may be more willing to execute a data models that failed non-mandatory criteria after the system has established that the available models have failed either (or both) mandatory or non-mandatory criteria.

In some implementations, mandatory criteria may be divided into multiple categories. For example, mandatory criteria may include no-run mandatory criteria. No-run mandatory criteria may include criteria that, when not met, inhibit operation of the data model or eliminate the value of the insights generated by the data model. For example, a data model that has lost its input data sources (or sources) may fail no-run mandatory criteria. In another example, a data model that for which no execution hardware platform is available may fail a no-run mandatory criterion. In some cases, failure of no-run mandatory criteria may cause the MEL 200 to cancel execution of the affected data model and prevent future execution until the no-run mandatory criteria are met.

The mandatory criteria may also include reduced execution priority (REP) mandatory criteria. When REP mandatory criteria are not met, the MEL 200 may cancel execution of the data model. However, rather than preventing future execution, the MEL 200 may reduce the priority of the data model for execution. For example, the MEL 200 may cancel execution of primary data model in response to a failure to meet a REP mandatory criterion and proceed to validation of a contingency data model. However, if the contingency data model also fails, the MEL 200 may return to the primary data model before indicating that no models are available. In some cases, the MEL 200 may return to the primary data model before proceeding to additional contingency data models. REP mandatory criteria may include criteria that may affect model accuracy but may still allow for useful insights to be gleaned from operation of the data model. For example, the data model may receive input data that mismatches a template because a sampling rate of the input data is lower that a given threshold. The low sampling rate may result in usable output data from the data model. However, the output may have reduced accuracy relative to output data generated using input data sampled at a rate in that meets the threshold. Accordingly, the data model may be demoted in priority below a contingency data model, which would produce lower accuracy output data when above threshold sampling rate input data is available.

Once a data model is selected and activated by the MEL 200, for example, either the primary data model or a contingency data model, the MEL 200 may initiate an accuracy check on the data model. Techniques for data model accuracy checking are described below. Further, the integration of the accuracy checks with the user interface of the feedback loop driven end-to-end state control system is discussed below.

The accuracy check verifies the output of the active data model. The validation process checks that execution state of the data model and the QCC verifies the input data. The validation and QCC of the MEL 200 is paired with an accuracy check by AAL 250. Accordingly, the MEL 200 may pass output (e.g., output from the data model or contingency output from a contingency data model) to the AAL 250 (216).

The AAL 250 may test to determine whether the results of the model are sufficient (252). The AAL may return an indicator of the accuracy to the MEL 200 (254). The MEL 200 may initiate retaining (220). In some cases, the retraining may include an automated self-healing process for the data model. If the data model is successfully re-trained, the data model may be re-deployed by the MEL 200 (222). If the MEL 200 is unable to retrain the data model, execution of the data model may be cancelled (224) and the MEL 200 may generate a cancellation message to inform the operator of the failure (226).

In some cases, the MEL 200 may monitor multiple parallel data models simultaneously. Thus, an operator may be informed of problems with a data model or the process monitored by the model for many data models in parallel. In various implementations, the MEL 200 may monitor hundreds, thousands, millions or more data models. Using a "no light display," UI feature, MEL 200 may operate a dashboard that shows only data models and processes warranting operator attention. Accordingly, a single operator may monitor up to thousands or millions or more of data models and accompanying processes single handedly. However, multiple operators may work together or in parallel to perform monitoring. In various implementations, each of the multiple operators may have access to all models in operation so that any operator may step in to replace another operator. In other implementations, the individual ones of the multiple operators may have access to different models.

The feedback driven end-to-end state control of the MEL 200 may prevent out-of-tolerance operation of a data model, which may prevent out-of-tolerance operation of a monitored system. Accordingly, the feedback driven end-to-end state control of the MEL 200 may improve the operation of the underlying hardware of the system running the data model and the monitored system.

In some implementations, the MEL 200 may retrain a data model without a failed accuracy check. For example, retraining may occur periodically or at other intervals scheduled by an operator. In some cases, retraining may occur on demand. Further, some implementations may not necessarily use a reference or accuracy check to guide retraining. For example, blind re-training may be performed by the MEL 200.

The MEL 200 may use various criteria for determining when to initiate retraining including: interval-based retraining, KPI-based re-training, manually initiated re-training; data-based re-training (e.g., using Data change metrics); source system initiated retraining, or other retraining criteria.

Figure 3:
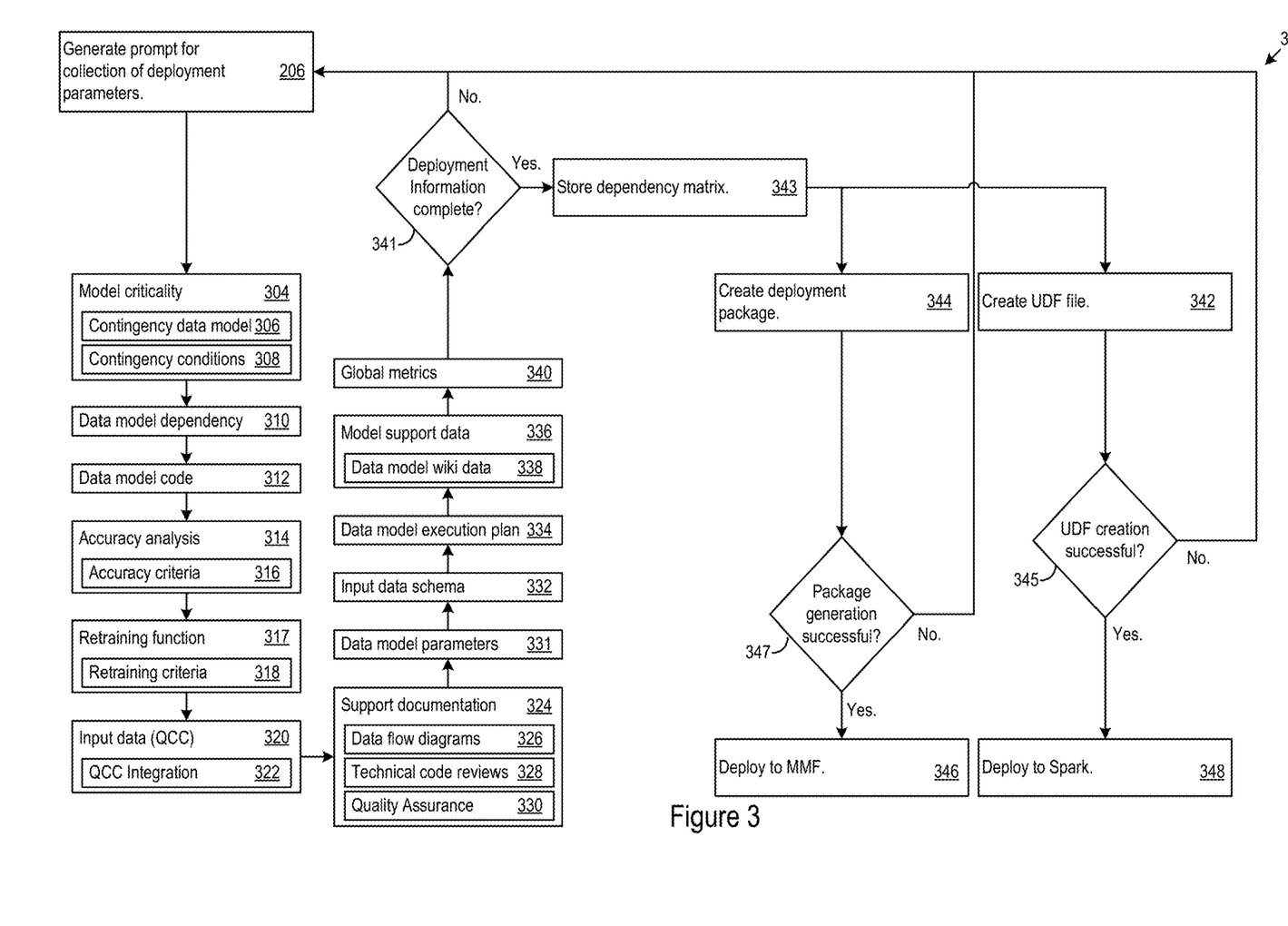
FIG. 3 shows an example deployment execution logic.

FIG. 3 shows example deployment execution logic (DEL) 300. The DEL 300 may prompt an operator for deployment parameters regarding criteria for validation, QCC, retraining, or accuracy checks (302). The criteria may include model criticality 304, which may include designation of one or more contingency data models 306 and conditions warranting switching to contingency data models 308. The criteria may further include model dependencies 310 and model source code 312. The criteria may specify accuracy functions 314, which may be accompanied by accuracy criteria 316 for evaluation of the function output. The criteria may identify retraining functions 317 along with retraining criteria 318 for evaluation retraining results. The criteria may specify input data sources 320 for a model paired with information 322 for QCC operation and integration.

Support documentation 324, which may include data flow diagrams 326, technical source code review documents 328, and quality assurance code review procedures 330; model parameters 331, input data schema 332; model execution plans 334 for consistent deployment and operation; model support data 336, which may include wiki data 338 for a model; and global metrics 340 applicable to multiple operation states and system components.

Once the deployment parameters are designated, the DEL 300 may check for completeness. If the deployment parameters are incomplete, the DEL 300 may prompt an operator for additional input. Additionally or alternatively, the DEL 300 may implement default values or comb prior deployments for usable parameters. In some cases, when the deployment parameters are still incomplete after prompts for additional parameters are sent, the DEL 300 may determine whether the missing parameters are mandatory or not mandatory. If the missing parameters are mandatory, the DEL 300 may reject the deployment validation criteria. If the missing parameters are non-mandatory, the DEL 300 may proceed without the non-mandatory parameters. In some cases, an operator may specify whether a parameter is mandatory.

The DEL 300 may determine whether or not the deployment information is complete (341). For example, the DEL 300 may determine whether any parameters mandatory for operation have not been specified for deployment. After the DEL 300 determines that the deployment information is complete, the DEL may generate a dependency matrix for the data model and store the dependency matrix in the validation memory (343). The DEL 300 may create deployment packages (342) and UDF files (344). For example, the DEL 300 may apply a code rewrite to generate a new deployment files and packages by translating an existing packages into UDF files and Spark packages. The DEL 300 may determine whether the UDF file creation (345) and/or the Spark package generation (347) was successful. When the UDF files are successfully created, the UDF files may be deployed to Spark (346). When the deployment packages are successfully created, the deployment may be deployed to an MMF system (348).

Figure 4:
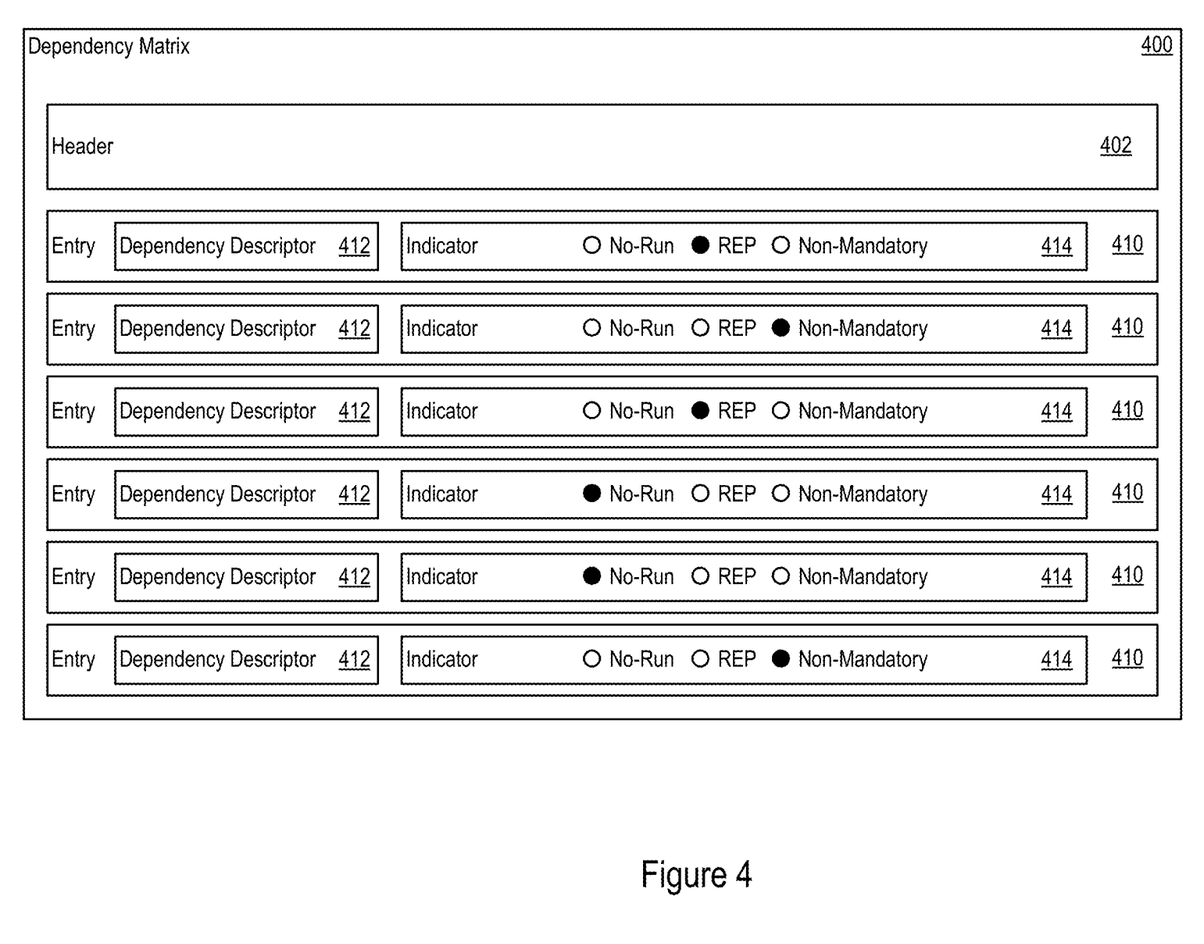
FIG. 4 shows an example dependency matrix.

FIG. 4 shows an example dependency matrix 400. The example dependency matrix 400 may include a header 402 that may indicate the data model or models that are governed by the dependency matrix 400. For example, the header may include model names, types (e.g. K Means, Linear Reg, Naive, Decision Tree, or other model types), process IDs or other identifiers for data models. The dependency matrix may further include entries 410 for dependencies for the governed data models. The entries 410 may include dependency descriptors 412. The dependency descriptors 412 may describe the particular dependency relationship identified by the entry 410. The dependency descriptors 412 may include scripts, pointers, strings or other indicators of resources on which the governed data models depend for their operation.

In some implementations, the entries 410 may further include indicators 414 that specify whether the dependency listed in the dependency descriptor 412 is mandatory. In some implementations (including the example dependency matrix 400 shown), the indicator 414 may further show whether mandatory dependencies are no-run or REP mandatory dependencies. However, in some cases, the indicators 414 may be omitted. For example, in some implementations, criteria may be implicitly identified as mandatory or non-mandatory.

In some implementations, other data structures may be used for dependency matrices. For example, the header 402 may be omitted. The dependency matrix may be identified with one or more data models through metadata or by being stored along with documentation for the data model. In other cases, a dependency matrix may apply to all data models, data models in of given type or class or otherwise implicitly associated with data models. Accordingly, a header expressly specifying an association may be obviated.

In an example scenario, one or more data models running on a feedback loop driven end-to-end state control system may be used to predict catastrophic "foaming events" at petrochemical facilities. Foaming events can cause damage if undetected. For example, a single foaming event may cause about $100 million in costs and damages. In some cases, data models may be capable of predicting foaming events. Accordingly, plant managers can be proactive in prevention and avoid costly shutdowns. For example, a data model (e.g., a primary data model or contingency data model) may include thresholds for proactivity. For example, when the predicted probability of a foaming event exceeds a pre-determined threshold, the feedback loop driven end-to-end state control system may cause a petrochemical refining system to inject an anti-foaming agent into its petrochemical stock. For example, an anti-foaming agent may include an emulsion, an alcohol-based anti-foaming agent, alkyl polyacrylate, or other anti-foaming substance. The injection may increase the concentration of anti-foaming agent present in the petrochemical stock and reduce the probability of a foaming event. Tying the injection of the anti-foaming agent to predictions by the data model may allow for more fine-tuned deployment of the anti-foaming injection, which may reduce operating costs for the plant without increasing the frequency of foaming events.

In another example scenario, a data model may be used to predict retail customer decisions and generate actionable insights. However, if false-positives become too prevalent, the data model user may lose credibility through repeated ineffectual actions. If false-negatives become too prevalent, opportunities for beneficial interaction, such as cross-selling or up-selling, may be missed. Accordingly, when the data model veers too far into the range of false-positives or false-negative it may warrant retraining.

Moving now to accuracy analyses performed by the AAL 250, the AAL 250 may measure accuracy by determining how often the data model makes a correct prediction. In other words accuracy may be represented as the ratio between the number of correct predictions and the total number of predictions that the a data model makes:

$$\mbox{accuracy}=\frac{\mbox{\# correct predictions}}{\mbox{\# total data points}}$$

The AAL 250 may implement various analysis frameworks to determine the accuracy of a data model. For example, as described below, the system may implement a confusion matrix, per-class accuracy measures, log-loss accuracy analysis, area under the curve analyses, or any combination thereof. Additionally or alternatively, the model management tools discussed below may include functionality to add and/or remove analysis frameworks from the system. For example, the frameworks discussed below may serve as a base set of tools that an operator may add to and/or subtract from during operation of the system.

In some implementations, the AAL 250 may calculate per-class accuracies in addition to overall accuracies. An overall accuracy may not necessarily include a distinction between classes. For example, correct answers for class 0 and class 1 may be treated equally when the AAL 250 computes an overall accuracy. In some cases, it may be advantageous for the AAL 250 to track classes individually. This may be the case if the cost of misclassification is different, or if one class has more representative output data. For instance, determining that a foaming event will occur when it does not (known as a false positive) may have very different consequences than determining that a foaming event will not occur when a foaming event in imminent (a false negative). A confusion matrix (or confusion table) shows a more detailed breakdown of correct and incorrect classifications for each class. The rows of the matrix correspond to measurements (e.g. by physical sensors), and the columns represent the prediction.

Table 1 shows an example confusion matrix that contains 100 examples in the positive class and 200 examples in the negative class.

TABLE 1

|  | Predicted as positive | Predicted as negative |
|---|---|---|
| measured as positive | 80 | 20 |
| measured as negative | 5 | 195 |

In the example confusion matrix, the positive class has a higher misclassification rate (20/(20+80)=20%) than the negative class (5/(5+195)=2.5%). This information may not necessarily be apparent from the overall accuracy, which in this case is (80+195)/(100+200)=91.7%.

In some systems, the AAL 250 may determine the average per-class accuracy, which may include the average of the accuracy for each class. Overall accuracy is an example of a micro-average because it may be derived by averaging the outcomes of individual results. Average per-class accuracy is an example of a macro-average because it may be determine by calculating an average of previously-calculated accuracies. In the above example, the average per-class accuracy would be (80%+97.5%)/2=88.75%. In the example case, the average per-class accuracy is different from the overall accuracy. However, in some cases the average per-class accuracy may be the same as the overall accuracy. In some implementations, the average per-class accuracy may be used to prevent classes with many instances from being overrepresented in the accuracy measurement.

However, if there are very few examples of one class, then test statistics for that class will have a large variance. Accordingly, the reliability of the accuracy measurement for one class may be lower than that of another. Thus, an overall accuracy may be more reliable than an average of multiple classes with differing degrees of variance.

In some implementations, if the raw output of the data model is a numeric probability instead of a class label of 0 or 1, then a log-loss-based accuracy analysis may be performed by the AAL 250. The probability may serve as a gauge of confidence. If the true label is 0 (e.g., a negative outcome) but the data model predicts that it belongs to class 1 (e.g., a positive outcome) with probability 0.51, then the data model may lead to an incorrect response by the system. For example, the system may invoke a response in preparation for positive result, because of the slightly higher predicted odds that it occurs. However, because the probability is close to the decision boundary of 0.5, the actual prediction by the system is less definitively in error than the selected response by the system. Log-loss-based analyses allow the AAL 250 to incorporate probabilistic confidence predictions into accuracy models.

In some implementations with binary outcomes (e.g., two possible outcomes), the log-loss-based accuracy may be represented using:

$$\mbox{log-loss} = -\frac{1}{N}\sum_{i=1}^{N} y_i \log p_i + (1-y_i) \log(1-p_i)$$

Where pi is the probability that the $i^{th}$ data point belongs to class 1, as judged by the data model. yi is the measured outcome and is either 0 or 1 (corresponding to the two allowed outcomes). In some cases, the log-loss may represent the cross entropy between the distribution of the measured outcome and the predictions, which may be related to the relative entropy, or Kullback-Leibler divergence. Entropy may be used to measure the unpredictability a system. Cross entropy incorporates the entropy of the measured distribution combined with the unpredictability that arises from the system assuming a different distribution than the measured distribution. Log-loss is measure of the "noise" that comes from using a predictor as opposed to measured outcome. In other words, the data model predictions may be treated by the system as a "noisy" version of the measure data (e.g., the signal). The AAL 250 may calculate the log-loss to determine how much noise the data model creates. In some cases, reducing the cross entropy, may increase the accuracy of the data model.

Figure 5:
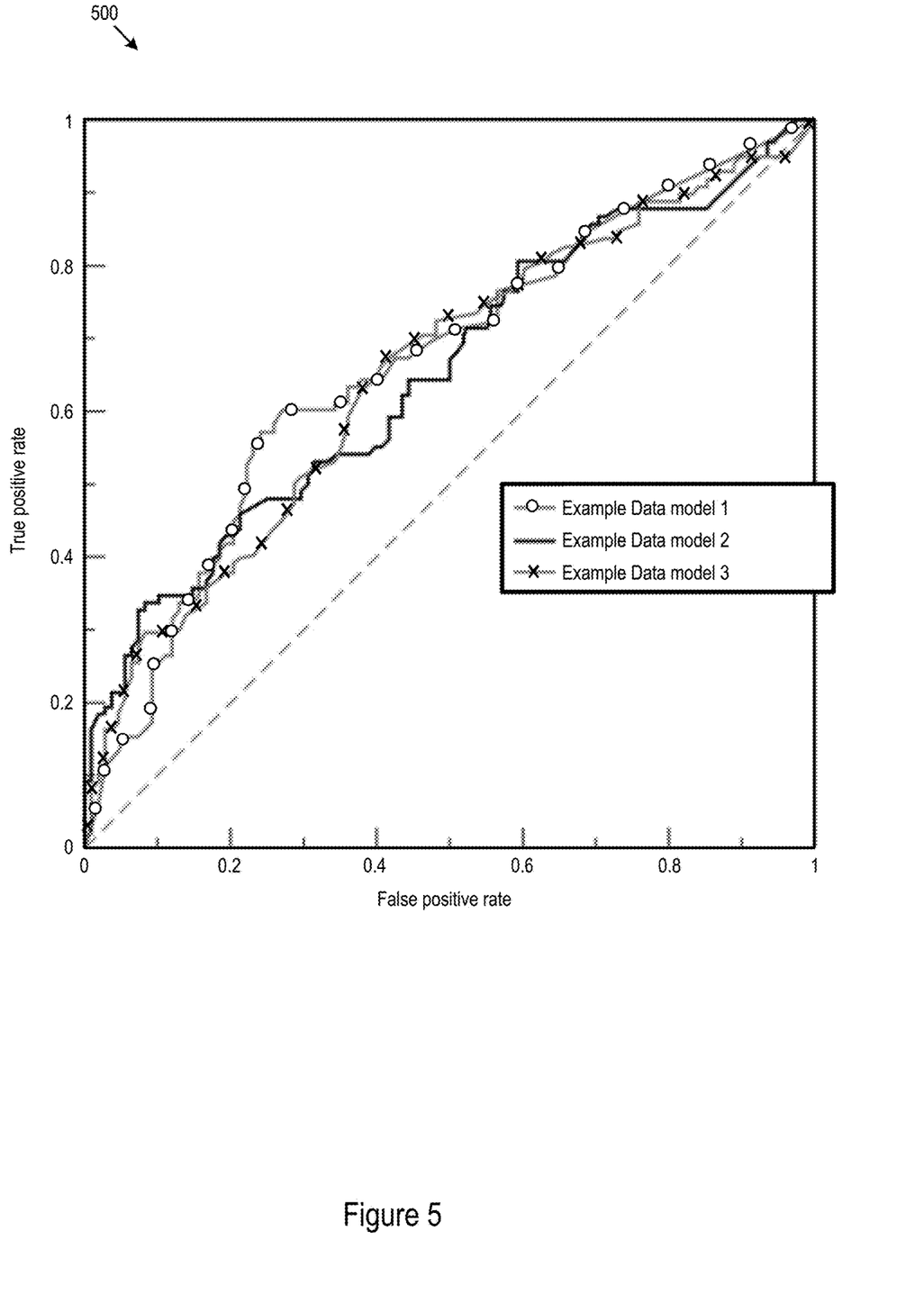
FIG. 5 shows an example plot of example ROC curves.

In some implementations, the AAL 250 may implement a Receiver Operating Characteristic (ROC) curve based accuracy analysis. The ROC curve may show the sensitivity of the data model by plotting the rate of true positives to the rate of false positives. A true positive may include occurrences where a predicted positive outcome corresponds to a measured positive outcome, and a false positive may include occurrences where a predicted positive outcome corresponds to a measured negative outcome. The shape ROC curve may reflect the true positive classifications that may be gained as ones allow for more and more false positives. For example, a perfect positive classifier has a true positive rate of 100% without incurring any false positives and would maintain a true positive rate of 100% for any percentage of false positives. Accordingly, the ROC curve would be a constant line at a 100% true positive rate. FIG. 5 shows an example plot 500 of example ROC curves for three example data models.

In some implementations, the AAL 250 may determine the area under the curve (AUC). The AAL 250 may be use the AUC to summarize the ROC curve using a single number, such that ROC curves for different systems may be compared easily and automatically. Better ROC curves may have larger AUCs since the AUC of a perfect ROC curve would be 1 and a perfectly bad ROC curve would have an AUC of zero.

The AAL 250 may be configured by operators to support various accuracy measurement analyses. Other analyses for evaluating data model accuracy may include AUC analyses of lift and gain charts, odds ratios, and sensitivity and specificity.

Figure 6:
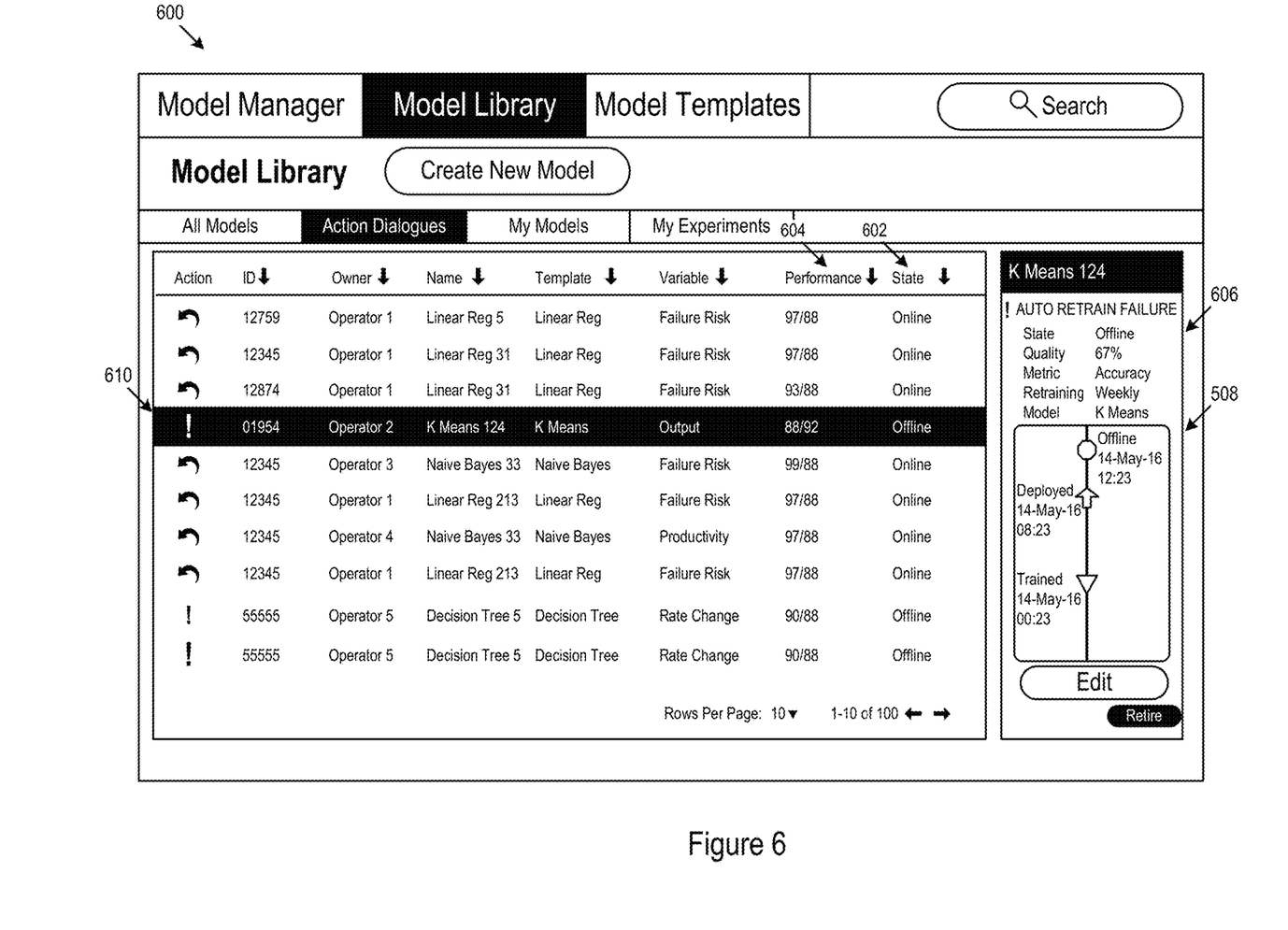
FIG. 6 shows an example user interface for monitoring multiple models in various states of operation.
Figure 7:
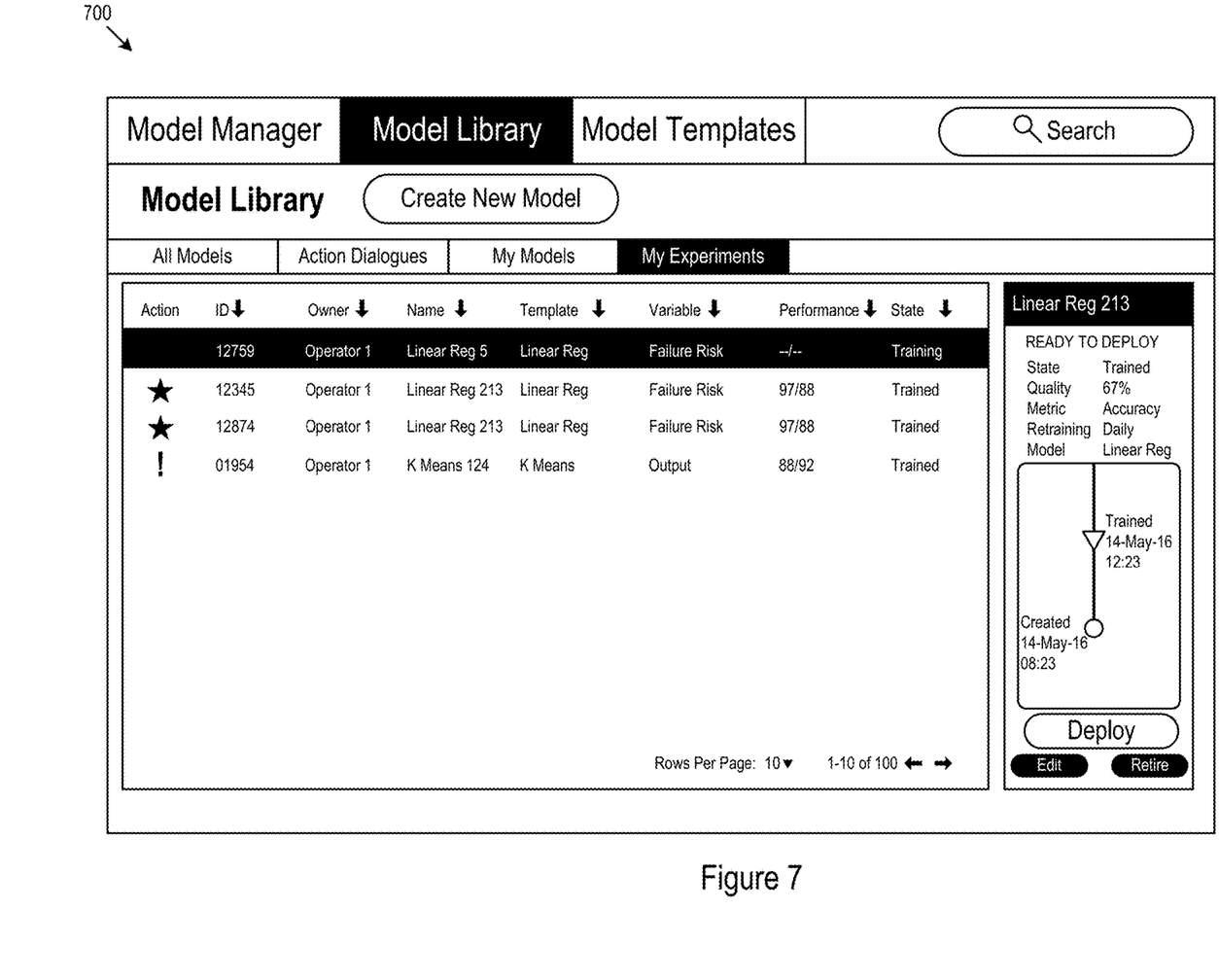
FIG. 7 shows an example second state of the example user interface of FIG. 6.

FIG. 6 shows an example user interface 600 for monitoring multiple models in various states of operation. The user interface 600 may display operating status 602 and performance statistics 604. The user interface 600 may further show detail information 606 and historical data 608 for a selected data model 610. FIG. 7 shows an example second state 700 of the example user interface 600 of FIG. 6. In the example second state 700, the models are filtered by model owner. Accordingly, an operator may use the user interface to view all data models or some subset of data models filter according to a selected characteristic.

Figure 8:
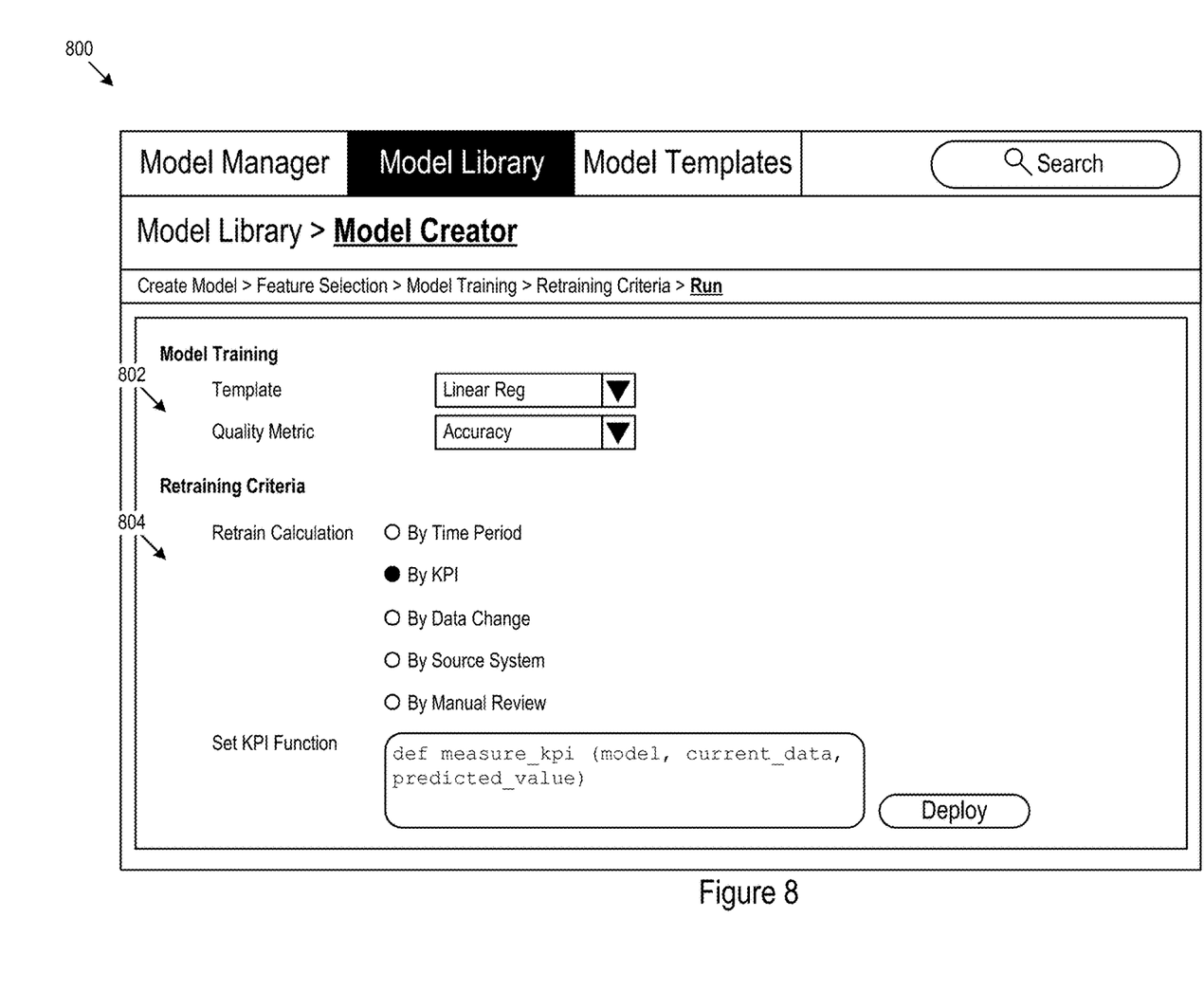
FIG. 8 shows another example user interface for retraining criteria input.
Figure 9:
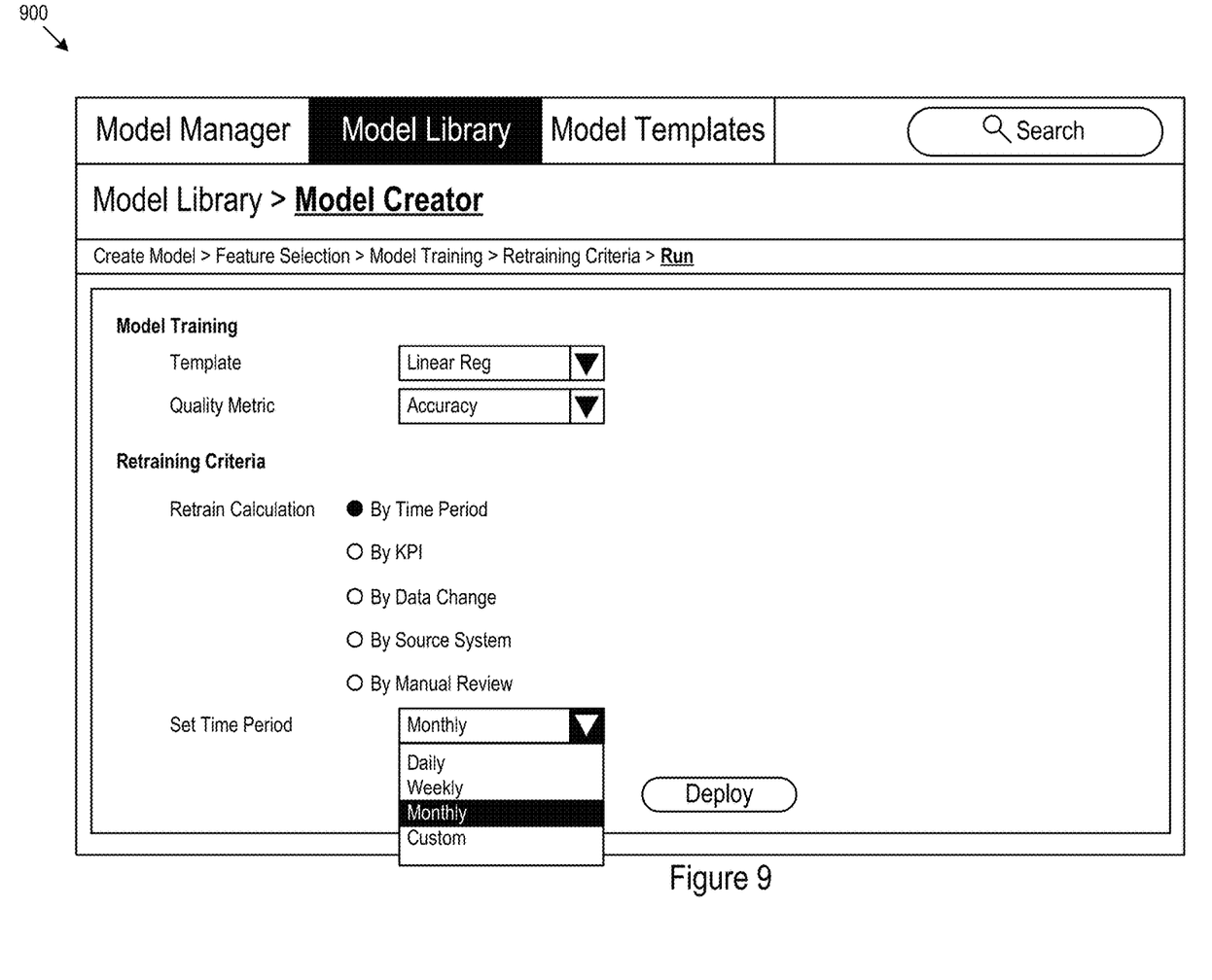
FIG. 9 shows an example second state of the example user interface of FIG. 8.

FIG. 8 shows another example user interface 800 for retraining criteria input. The example user interface 800 may include fields for designating retraining criteria, such as, setting the retraining calculation 802 and designating a retrain function 804 corresponding to the selected retrain function. In the example state of the user interface shown in FIG. 8 a KPI-based retrain calculation is selected. FIG. 9 shows an example second state 900 of the example user interface 800 of FIG. 8. In the example second state 900, a time-based retrain calculation is selected.

In some implementations, the system may include extensible interfaces, e.g., API based interfaces, with the ability to add interfaces to handle legacy software or new computational engines.

Figure 10:
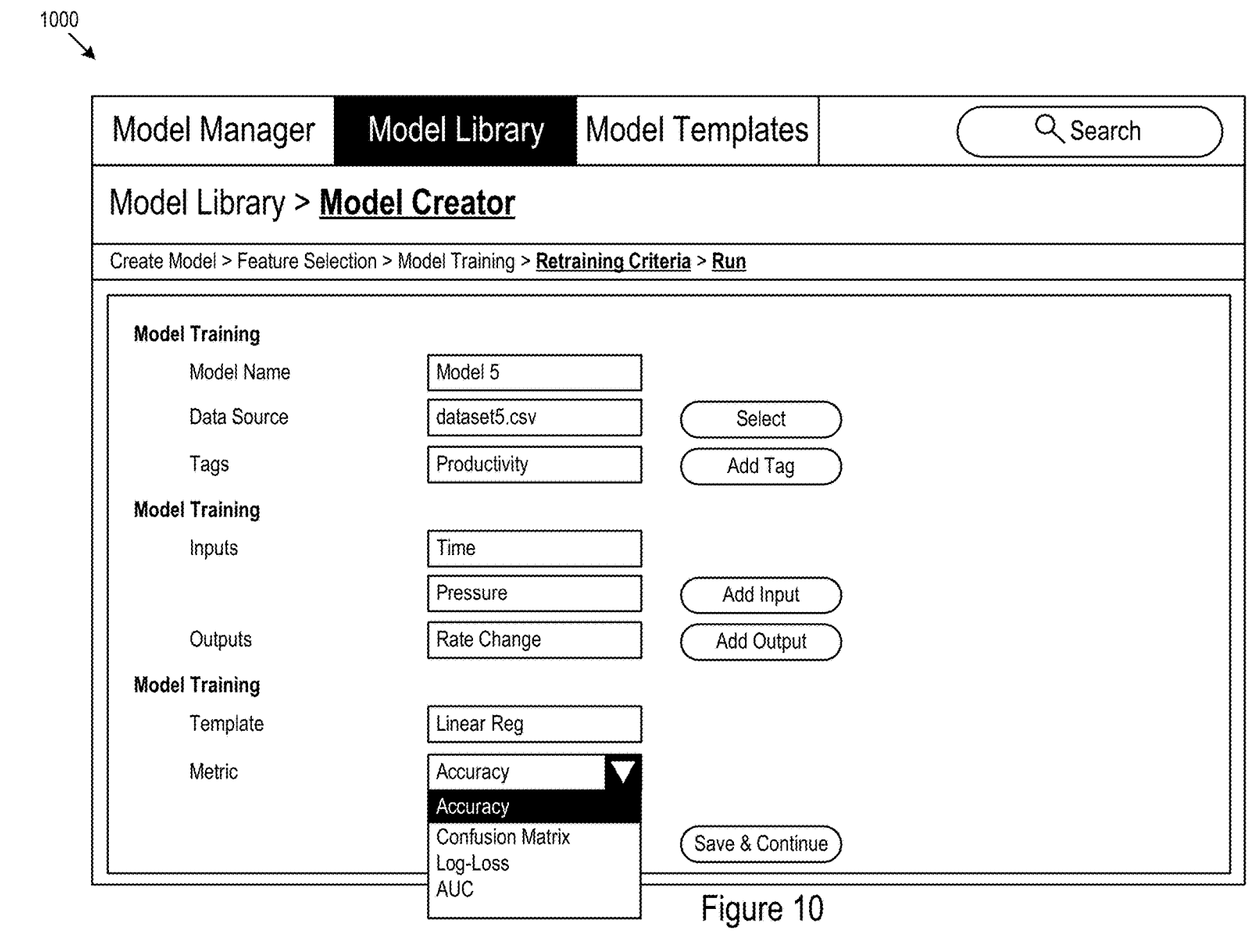
FIG. 10 shows an example user interface for data model creation.

FIG. 10 shows an example user interface 1000 for data model creation. The example user interface 1000 may include fields for operator input regarding model operation, deployment, and identification data. The user interface 1000 may render tools for operator input to support operational documentation. In various implementations, groups of operators may maintain a 'wiki' or multi-operator editable database of data model operation documentation.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
accessing, in validation memory, a dependency matrix for a child data model;
responsive to the dependency matrix for the child data model, determining a parent data model that is mandatory for execution of the child data model;
comparing, using model execution circuitry, feedback data generated using the parent data model to a template to determine whether the feedback data conforms to the template;
when the feedback data does not conform:
cancelling an execution of the child data model;
generating a first prompt indicating that execution of the child data model has been cancelled;
determining a contingency data model for the parent data model, the child data model or both;
executing the contingency data model; and
passing contingency output from the contingency data model to accuracy analysis circuitry;
using the accuracy analysis circuitry, performing a first accuracy check to determine whether to retrain the contingency data model, the first accuracy check comprising a comparison of a predicted value from the contingency output to a later-measured physical sensor value;
when the accuracy analysis circuitry determines to retrain the contingency data model:
via the model execution circuitry, retraining by adjusting an first operational parameter for the contingency data model; and
after retraining, re-launching the contingency data model using the model execution circuitry; and
when the feedback data conforms, execute the child data model.

2. The method of claim 1, where:
the dependency matrix further includes an entry indicating an non-mandatory criterion for execution of the child model; and
the method further includes:
when the non-mandatory criterion is not met and the parent model has not failed:
generating a second prompt indicating that the non-mandatory criterion has not been met; and
executing the child data model.

3. The method of claim 2, where generating the second prompt comprises presenting a user interface option to cancel execution of the child data model.

4. The method of claim 1, where the template comprises an indication of an output data format for the parent data model.

5. The method of claim 4, where the method further comprises:
after comparing the feedback data to the template;
determining whether a conversion function is available to convert the feedback data to the output data format;
when the conversion function is available, determining that the parent model has not failed; and
when the conversion function is not available, determining that the parent model has failed.

6. The method of claim 1, where executing the contingency data model comprises executing a data model calibrated for lower predictive accuracy than the child data model.

7. The method of claim 1, where the method further comprises:
generating model output using the child data model;
passing the model output to the accuracy analysis circuitry;
using the accuracy analysis circuitry, performing a second accuracy check to determine whether to retrain the child data model;
when the accuracy analysis circuitry determines to retrain the child data model:
retraining the child data model by adjusting a second operational parameter for the child data model; and
after retraining, re-launch the child data model.

8. The method of claim 1, further comprising, after executing the child data model, determining the retrain the child data model after a pre-defined interval has passed.

9. The method of claim 1, further comprising, generating, via deployment execution circuitry, the dependency matrix for the child data model.

10. The method of claim 9, where generating the dependency matrix comprises including indications whether individual ones of criteria listed within the dependency matrix comprise mandatory criteria.

11. The method of claim 1, where performing the first accuracy check comprises applying a confusion matrix analysis, the confusion matrix analysis comprising:
generating a first memory entry within a confusion matrix accounting for false negative predictions based on the contingency output; and
generating a second memory entry within the confusion matrix accounting for false positive predictions based on the contingency output.

12. The method of claim 1, where performing the first accuracy check comprises applying a receiver operating characteristic (ROC) curve analysis, the ROC curve analysis comprising determining an area under an ROC curve representation of the contingency output to select a ratio between false negative predictions and false positive predictions.

13. A system comprising:
validation memory comprising a dependency matrix for a child data model, the dependency matrix including an indicator of a parent data model that is mandatory for execution of the child data model;
accuracy analysis circuitry configured to perform an accuracy check determine whether to retrain the child data model, the accuracy check comprising a comparison of a predicted value from model output to later-measured physical sensor value; and
model execution circuitry in data communication with the validation memory, the model execution circuitry configured to:
access the dependency matrix for the child data model;
responsive to the dependency matrix for the child data model, determine that the parent data model is mandatory for execution of the child data model;
compare feedback data generated using the parent data model to a template to determine whether the parent data model has failed;
when the parent model has failed:
cancel an execution of the child model;
generate a prompt indicating that execution of the child model has been cancelled;
determine a contingency data model for the parent data model, the child data model or both; and
execute the contingency data model;
when the parent model has not failed:
execute the child data model;
generate the model output using the child data model;
pass the model output to the accuracy analysis circuitry;
when the accuracy analysis circuitry determines to retrain the child data model:
retrain the child data model by adjusting an operational parameter for the child data model; and
after retraining, re-launch the child data model.

14. The system of claim 13, further comprising deployment execution circuitry in data communication with the validation memory, the deployment execution circuitry configured to:
generate the dependency matrix; and
cause the validation memory to store the dependency matrix.

15. The system of claim 14, where the deployment execution circuitry is configured to generate the dependency matrix by indicating whether multiple criteria included within the dependency matrix comprise mandatory criteria for execution of the child data model.

* * * * *